United States Patent [19]
Danielsen

[11] 3,812,755
[45] May 28, 1974

[54] PRODUCT, PREFERABLY A ROTATABLE WORKING TOOL, E.G., A SAW BLADE

[75] Inventor: Bo Sixten Danielsen, Nora Stad, Sweden

[73] Assignee: AB Nora-Gomex, Nora Stad, Sweden

[22] Filed: Dec. 14, 1971

[21] Appl. No.: 207,895

[30] Foreign Application Priority Data
Dec. 14, 1970  Sweden............................ 16892/70
Apr. 20, 1971  Sweden.............................. 5081/71

[52] U.S. Cl...................... 83/835, 76/112, 29/95 B
[51] Int. Cl...................... B27b 33/08, B23d 61/02
[58] Field of Search ............ 83/835, 838, 846, 847, 83/848, 854, 855; 76/101 R, 101 A, 112, DIG. 6; 29/95 R, 95 B

[56] References Cited
UNITED STATES PATENTS
| | | | |
|---|---|---|---|
| 193,985 | 8/1877 | McRae | 83/838 |
| 2,794,458 | 6/1957 | Dosker | 83/835 |

FOREIGN PATENTS OR APPLICATIONS
| | | | |
|---|---|---|---|
| 182,776 | 2/1936 | Switzerland | 83/835 |
| 183,743 | 4/1936 | Switzerland | 83/835 |
| 1,042,874 | 11/1958 | Germany | 83/835 |

Primary Examiner—Donald R. Schran
Attorney, Agent, or Firm—Browdy & Niemark

[57] ABSTRACT

A rotatable working tool assembled of at least two parts which are intimately interconnected by a flue and adapted to eliminate oscillations; the glue may contain an electrically conductive material to enable spot welding of the parts together.

13 Claims, 12 Drawing Figures

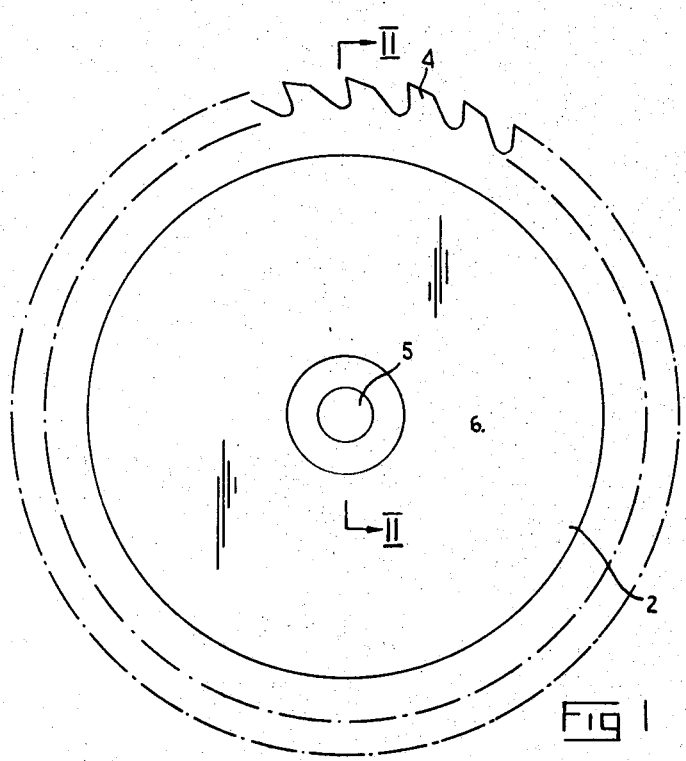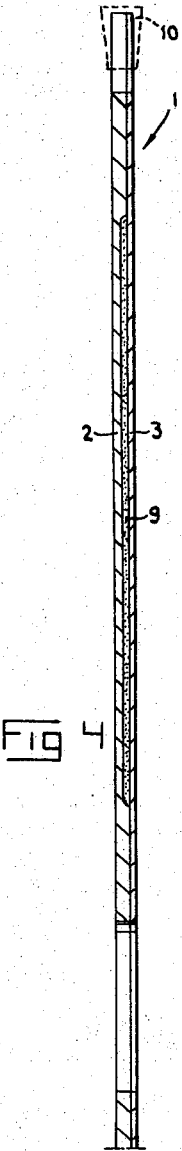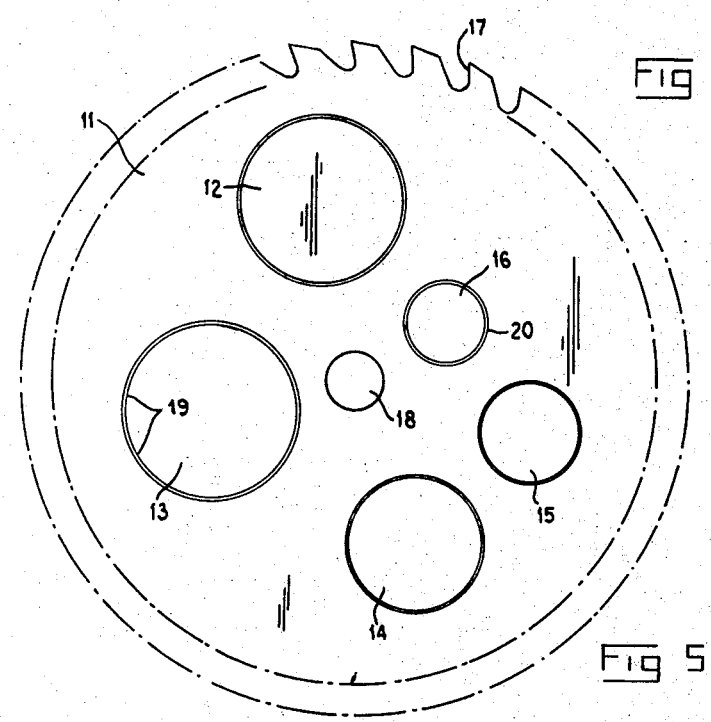

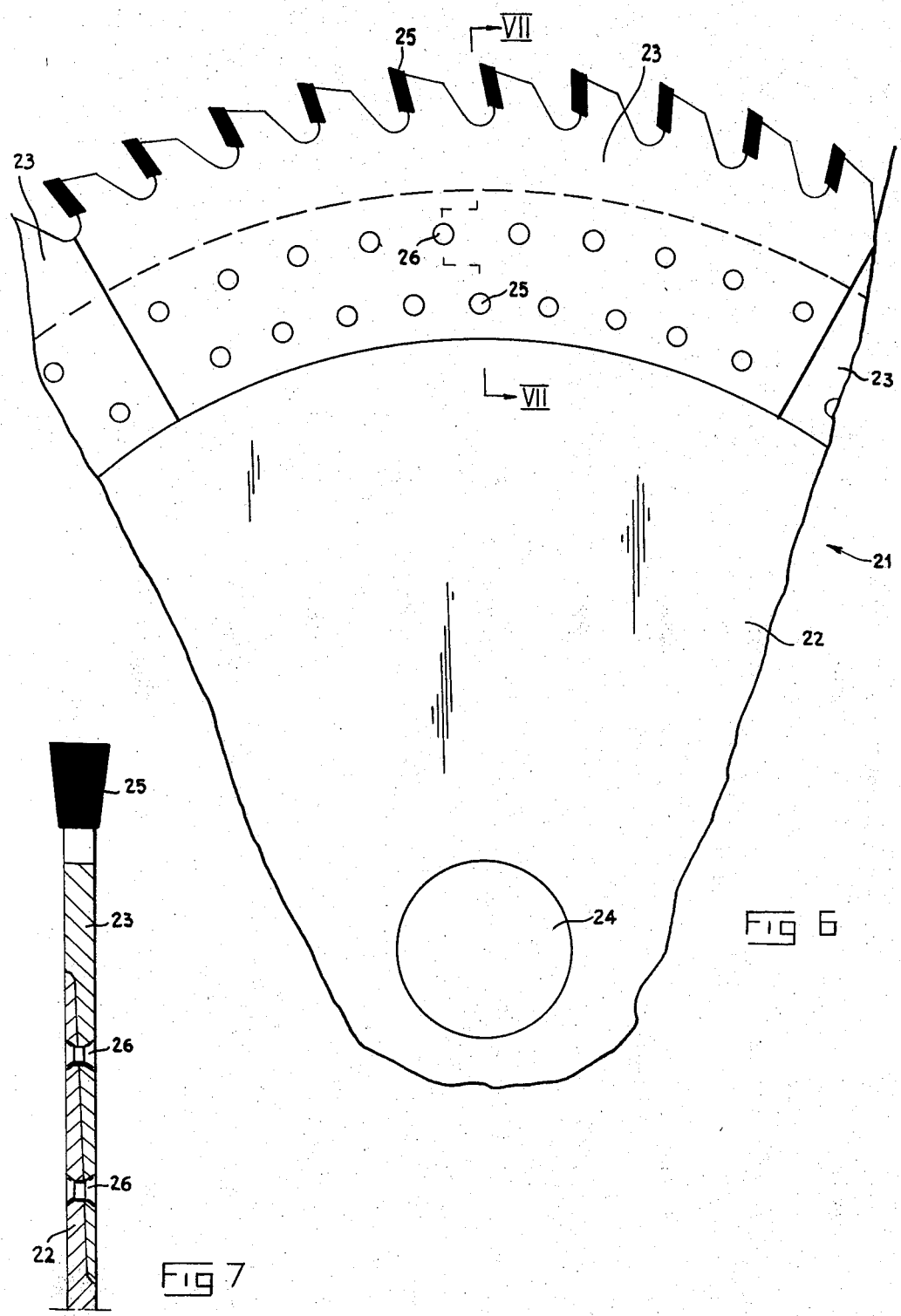

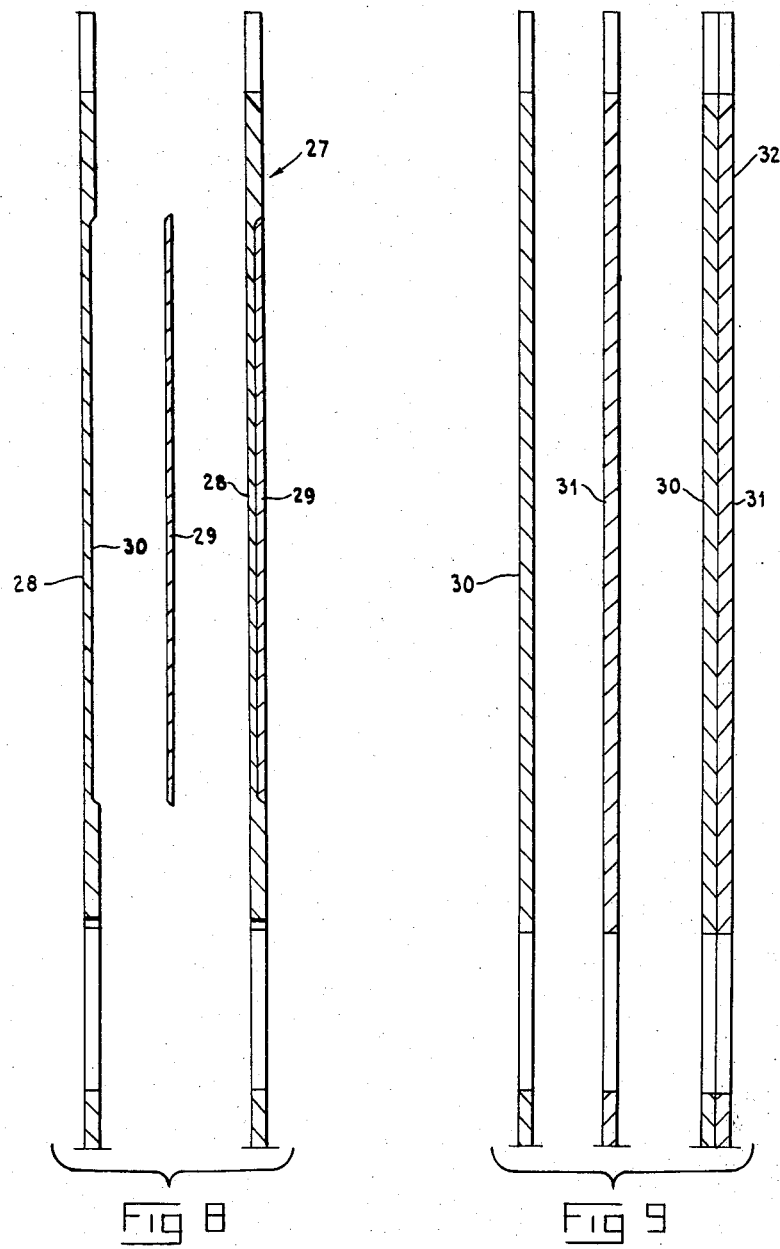

PRODUCT, PREFERABLY A ROTATABLE WORKING TOOL, E.G., A SAW BLADE

The present invention relates to a rotatable working tool, such as a saw blade, of the type assembled of at least two parts or portions which are intimately joined to each other and thus adapted to eliminate or damp each other's oscillations in order to avoid a disturbing noise otherwise generated by these oscillations.

An object of the invention is to make tools of this type more efficient, more simple, more noiseless, stronger and of lower cost.

The invention proposes to interconnect said parts to a disc like unit by a glue or adhesive. The glue is preferably of the epoxy resin kind.

Further, the invention proposes to make the glue electrically conductive in order to make it possible to weld the parts together. A further proposal is to partially solder the parts together.

These and other features and advantages according to the invention will appear from the patent claims and from the following description in which preferred embodiments are dealt with under reference to the appended drawings.

Figures 10, 11:
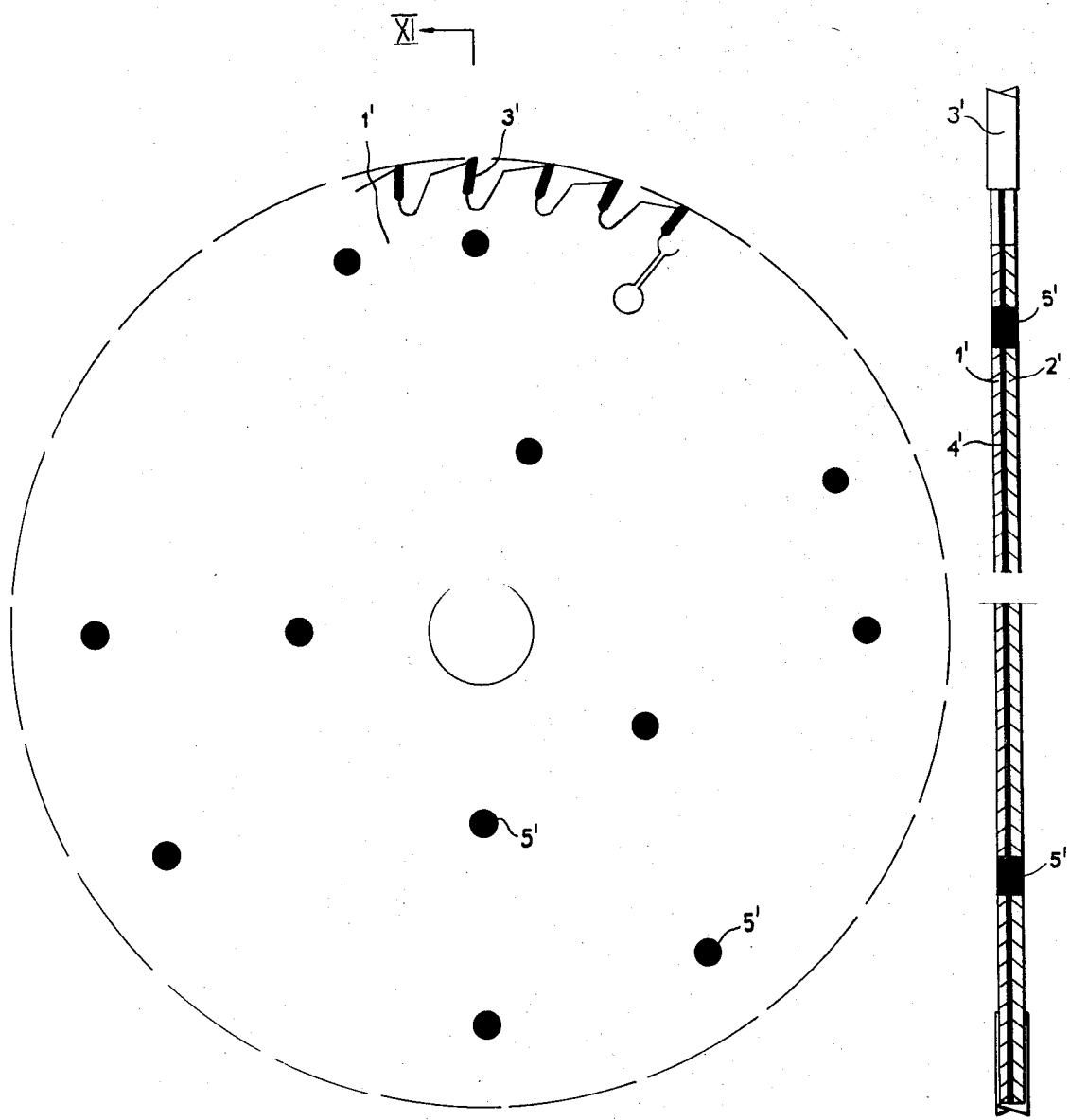
Figure 12:
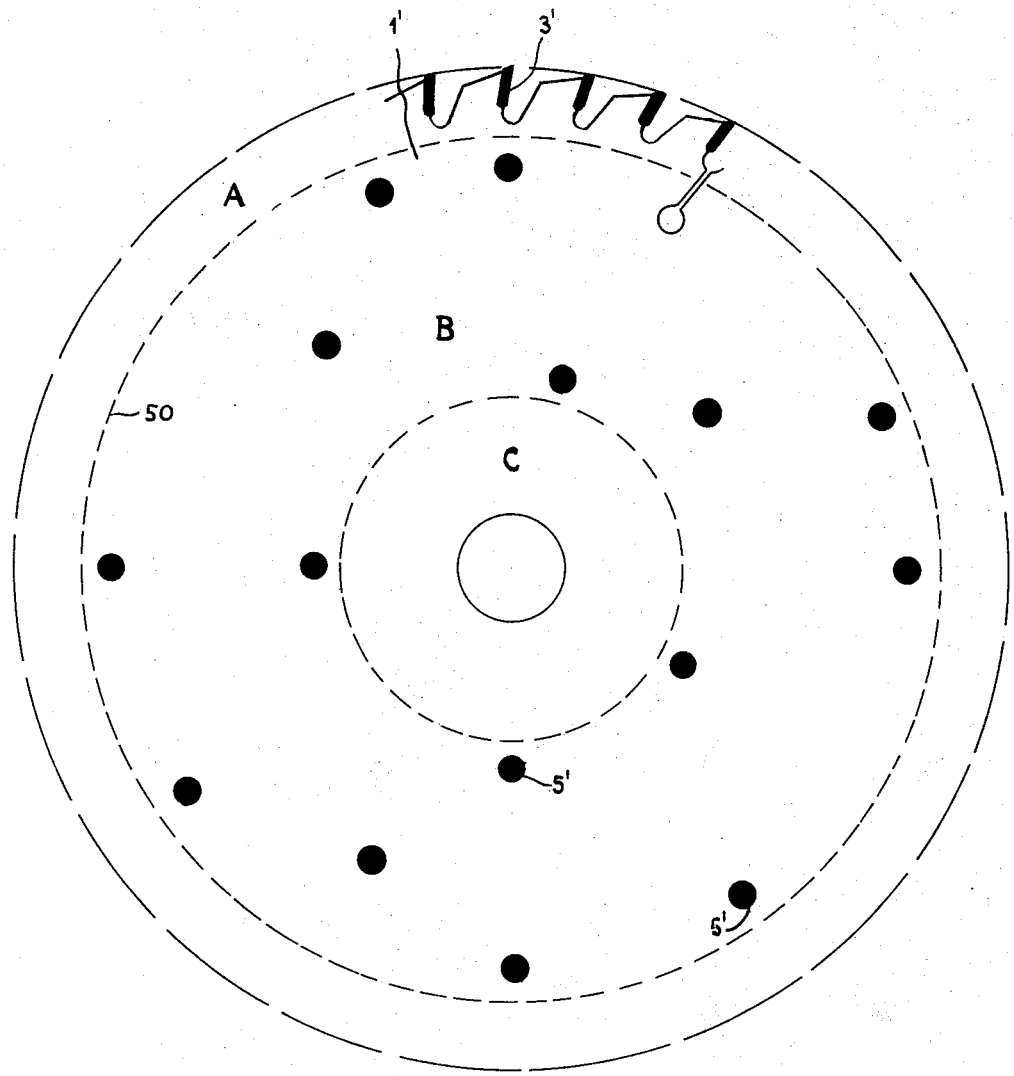

In the drawings FIGS. 1-4 show a first embodiment of a tool according to the invention, in this case a saw blade. FIG. 1 is a side view of a part of the tool, FIG. 2 an enlarged cross sectional view 2—2 of said part, FIG. 3 a cross sectional view of another part and FIG. 4 a cross sectional view of the parts in an assembled condition. FIG. 5 shows a side view of a second embodiment of the tool. FIG. 6 shows a partial side view of a third embodiment and FIG. 7 a partial, enlarged sectional view taken along the line VII—VII in FIG. 6. FIGS. 8-9 show a further alternative. FIG. 10 shows a still further embodiment and FIG. 11 a cross sectional view along the lines XI—XI in FIG. 10. FIG. 12 is similar to FIG. 10, however indicating a partly soldered saw blade.

The tool illustrated in FIGS. 1-4 is generally designated by 1 and it has in this special case the form of a circular saw blade. The tool 1 is assembled of two sheets or discs 2 and 3, which form in unison a disc like unit. As appears by FIGS. 1 and 2, the part 2 consists of a substantially circular disc which is formed along its periphery with saw teeth 4 of shoulders for the securing of cutting bits or other working means. In the center of the disc there is a bore 5 to attach the disc to a drive shaft. On one side of the disc 2 is recessed an annular and more or less shallow recess or depression 6. In a manner analogous to the disc 2 the second disc 3 is circular, provided with teeth or shoulders 7 and provided with a central bore 8. In other respects the disc 3 is substantially totally planar. The disc 3 has a thickness that is markedly less than the thickness of the disc 2, whence follows that the natural vibration frequencies of the respective discs are different.

FIG. 4 shows the manner by which the two sheet or disc elements 2 and 3 were intimately united to each other while forming an integrated unit, in fact the saw blade 1, and the interconnection of the part discs has been accomplished according to the invention by means of a glue 9 introduced into and filling up the depression 6. Obviously the glue may preferably be coated or applied to all of the surfaces of the part discs abutting to each other. Acoustical investigations of different glues or adhesive means have proven that a satisfactory effect, i.e., a highly decreased noise level, will be obtained even if the glue is extremely hard in its hardened condition. Owing to this a glue of epoxy type or similar is preferred to this end. If such is found to be convenient the peripheral parts of the discs may be joined to each other by means of working means, e.g., cutting edges 10, as indicated by broken lines in FIG. 4. Thanks to the fact that the tool is assembled of two lamina like discs or sheets having different natural vibration frequencies a radical decrease of the noise level is obtained as compared to an otherwise analogous tool consisting of one single piece. The oscillations of the two disc elements cancel each other. In addition the advantage is also obtained that the tool owing to its laminated structure will be extremely rigid and resistant.

It is understood that the tool may be assembled of more than two discs.

Reference is now made to FIG. 5 which shows an alternative embodiment of a tool. In accordance with the invention this tool is assembled by, on one hand, at least one main piece 11 and, on the other, a plurality of partial pieces 12, 13, 14, 15 and 16, which are cut out or stamped out of the main piece though reunited to the same. The main piece 11 has the form of a planar circular disc provided with peripheral teeth or shoulders 17 besides a central bore 18 for a drive shaft. The number of partial pieces should be odd for attaining the best effect. It is also suitable that all of the partial pieces or groups of partial pieces should have different form or mass relative to each other which is however not necessary. The partial pieces may of course be made in various manners though it is preferred that they are stamped or cut by means of blow pipes out of the main piece. On the cutting out partial pieces are obtained, the natural vibration frequencies of which differ from that of the main piece. When the partial pieces are subsequently reassembled in place and joined intimately to the main piece — which can be made by pressure, glueing or welding, e.g., point welds 19 or continuous welds 20 — an integrated disc is obtained, comprising parts having different natural vibration frequencies relative to each other.

The geometric form of the partial pieces is arbitrary. They may be circular, oval, polygonal or irregular in another manner.

In FIGS. 6 and 7 an embodiment is shown wherein the tool 21 is assembled of at least one central, hub like part 22 and one or a plurality of peripheral parts 23. In the hub part 22 is a bore 24 for drive shaft. To the peripheral parts 23 cutting edges or bits 25 are applied. Though it is possible to use a single ring like peripheral part solely, there is in this case provided on the hub part a plurality of curved, relatively short part elements extending in unison along all of the periphery of the hub part. Two series of rivets 26 unite two oblique flanges in the respective parts. It is understood that the parts also can be joined to each other by welding or in another manner.

In FIG. 8 a tool 27 is shown assembled of a body like part 28 of the same kind as the part 2 shown in FIG. 2 together with a ring like part 29 which is disposed in the recess 30 and intimately joined to the part 28. The interconnection of the parts may preferably be accomplished by glueing in comparably thin layers, though it is for instance possible to weld the parts to each other.

In FIG. 9 a tool 32 is assembled of two halves 30 and 31, which each respectively have natural vibration frequencies differing from corresponding tools of a non-assembled type. The interconnection of the parts may with advantage be accomplished by glueing in comparably thin layers, though it is additionally also possible to weld the parts securely to each other.

The different parts comprised in the tool consist preferably of a metal or a metal alloy, preferably hardened steel.

In FIGS. 10 and 11 are 1' and 2' designing two essentially circular discs which are joined to each other by forming a body or a body blade of a saw blade. At the periphery of the discs shoulders are formed for the cutting edges 3' of the blade. The discs 1' and 2' may preferably be of different thicknesses as appears in FIG. 11. By 4' is designated a layer of glue or binding means which together with a number of spot welds 5' intimately unite the discs to each other.

According to the principle of the invention the blade shown is manufactured in the following manner. Finely divided metallic components are mixed into the binding components of a glue. In this connection glues occurring in commerce are of interest, for instance hardening glues of epoxy type or other plastic glues, though also rubber based glues may be used. The metallic components may preferably consist of copper, aluminum or other metals having a low resistivity and worked into powder form. As a rule most metals may be used independent of whether they have a low or high specific resistance. The only essential matter is that the material in question is electrically conductive. It may thus be an advantage economically to use iron filings. Trials have shown that the ratio of metallic components:binding components preferably is 1:10 by volume, but a satisfactory conductivity of the glue mixture will be obtained if the contents of metallic components in the mixture is comprised within the range 1-25 percent by volume, preferably 5-15 percent by volume.

If the glue is of the hardening type a hardener is added to the mixture prior to its application to the surfaces of the discs 1' and 2' to be joined. The application of the glue mixture is accomplished in such a manner that the whole of the surface of the discs will be covered. The discs are subsequently pressed together as for instance in special presses, and the glue mixture is allowed to cure or harden for a predetermined time.

After hardening of the glue mixture follows welding, in this case more particularly spot welding. To this end an arbitrary spot welding assembly is used including two opposite electrodes to be applied to each of the sides of the two discs glued together. According to a particular feature of the invention the welds are disposed irregularly or assymmetrically along the plane of the discs. Thus FIG. 10 shows how eight welds are disposed along an outer peripheral circle and four welds are disposed along an inner circle concentric to the outer circle. It is to be observed that the welds in each circle are disposed in such a manner that the spaces between two welds disposed at either side of an intermediate weld and said intermediate weld respectively are of a different size. Evidently the welds may also be ideally irregular, i.e., be disposed at random and completely non-geometrically along the disc plane. Owing to the irregular disposition of the welds and the extremely intimate connection between the discs the sonorous figure constituted by the two discs glued together alone and the body blade as a whole will obtain oscillation characteristics giving no or an extremely small noise. In addition the body blade has a maximum strength and rigidity and a great resistance and endurance to fatigue rupture. The strength of the saw blade is besides further increased by the fact that the cutting edges 3 are securely welded to the peripheries of the discs and form a kind of bridges between the discs.

It will be obvious that the welding is made possible by the electricity conducting properties of the glue, whereby the necessary contact for fusion of the metal material is obtained.

Below follows an example of the composition of a glue mixture suitable to be used in accordance with the principle of the invention.

90 parts by volume epoxy glue with hardener.
10 parts by volume aluminum powder A100.

The Al-powder is intimately mixed with the glue prior to the addition of the hardener which is made in the usual manner immediately before the glue mixture is applied to the disc surfaces.

A certain draw back is, however, to be found in the glued construction described above. When the edge pieces or bits 3, 25 are fastened by soldering to the pieces of the saw blades the outermost or circumferential annular portion of the saw blade is heated, and this causes the glue between the glued together parts to be at least partly burnt or destroyed, and subsequently the strength of the saw blade will diminish and there is also the risk that chips will enter between the parts or sheets.

However, according to a further feature of this invention this draw back is eliminated by obviating the spreading of glue along the said circumferential and annular area, and, instead, by supplying in this area a solder for soldering together the parts or sheets of the saw blade after fastening the bits 3, 25 or possibly at the same time with the fastening of the bits. In this way an extremely strong connection between the two sheets is obtained. Chips can no longer enter between the sheets, and the noise developed by the saw blade will be still further reduced.

The heating for soldering together the sheets at the circumferential area may be performed in a high frequency current of a heating apparatus. The saw blade having circular form may be suitably rotated with its circumferential portion under the heating effect of the apparatus.

A suitable solder for the just mentioned purpose is a silver solder, preferably a silver solder containing 35-55 percent, suitably about 42 percent silver, and various contents of Cu, Zn, Cd, and fluxing material, such silver solder having a melting temperature range of about 600°-625°C and a suitable soldering temperature of about 630°-640°C.

A full procedure for joining together two sheet portions so as to form a saw blade body may be as follows:

a. hot pressing the two sheet portions together at about 400°-440°C, preferably 420°C,
b. surface grinding the sheets,
c. rectifying or straightening the sheets,
d. degreasing the sheets,
e. spreading glue comprising a hardener and electrically conducting material upon the sheets except along circumferential or peripheral annular areas of the sheets, f. applying to the circumferential annular areas layers of silver solder, g. pressing the two sheets together until the glue has bound, h. securing the two sheets together by spot welding at spaced points chosen at random and unsymmetrically in respect of the circumference and the hub hole of the saw blade, i. fastening the cutters by soldering to the combined sheets, j. heating the circumferential or peripheral annular area, so as to make the silver solder applied to the sheets at that area bind the sheets together at the said annular area.

k. surface grinding the sheets to different thicknesses, l. rectifying or straightening the ground saw blade.

In FIG. 12 the dotted line 50 represents a sharp demarcation line between a circumferential or peripheral annular zone or area A where one or both of the two halves or sheets 1 and 2 have been provided with silver solder and subsequently soldered together. The glue area and the solder area should not overlap each other, since otherwise the glue would easily be more or less destroyed and carbonized by the heat and also detrimental to the binding properties of the silver solder.

The circular area B with a minimum radius of about one-third of the total radius of the saw blade and a maximum radius = the radius of the said demarcation line 50 may be glued with a glue containing a comparatively low percentage of the hardener in order to obtain comparatively elastic and noise-reducing properties, while the central or hub area C may be glued with a glue comprising a considerably higher percentage of hardener so as to obtain, at that hub area, a maximum of strength.

The border line 50 extends, e.g., along the bottoms of the spaces between the teeth of the saw blade or is adjusted 1-5 millimeters inwardly from the said bottoms towards the centre or hub of the saw blade. The outermost spot welds in the embodiment shown in FIG. 12 are situated some 25 millimeters inwardly from the peaks of the saw teeth.

The invention is not to be considered as limited to the embodiments described and shown in the drawings solely. The principle of the invention is thus applicable not only to precisely circular saw blades but also to other rapidly rotating tools such as milling cutters, grinding discs, diamond saws and the like. It is accordingly obvious that various modifications of the invention are possible within the scope of the following patent claims.

I claim:

1. A rotatable working tool made up of at least two parts or portions, which are intimately interconnected and adapted to eliminate or damp the oscillations of each other, the parts forming in unison a disc like unit, wherein said parts are interconnected by a glue into which an electrically conductive material is dispersed, the parts being welded together by spot welds.

2. A tool in accordance with claim 1, wherein the glue is an epoxy glue.

3. A tool in accordance with claim 1, wherein the spot welds are disposed unsymmetrically about said disc area.

4. A tool in accordance with claim 1, wherein said parts are further soldered together along a circular peripheral area thereof.

5. A tool in accordance with claim 4 wherein the solder used is a silver solder.

6. A tool in accordance with claim 5 wherein said silver solder comprises 35 – 55 percent Ag and various contents of Cu, Zn, Cd and fluxing material, the silver solder having a melting temperature range of about 600°–625°C., and a suitable soldering temperature of about 630°–640°C.

7. A method for manufacturing a rotatable cutting tool comprising two sheet portions fastened together, comprising the steps of a. mixing into a glue an electrically conductive material which is dispersed into the glue, b. glueing together the sheets with the product of said mixing step, and c. spot welding the sheet portions together by spot welds disposed at random or unsymmetrically in respect of the diameter and a hub portion of the rotatable tool.

8. A method as claimed in claim 7 wherein said glueing and welding steps comprise:

a. spreading the electrically conductive material containing glue over the whole area of the surfaces of the two sheets except along a peripheral annular area, b. providing the said annular area with a layer of a silver solder, with a melting temperature of about 600°C., c. pressing the two sheets together until the glue has bound, d. securing the sheets together by spot welding at spaced points, e. fastening the cutters or bits one at a time by soldering them to the combined sheets, using a silver solder melting at a temperature higher than the melting temperature of the solder used for soldering together the sheets, f. heating the circumferential or peripheral annular area so as to make the silver solder bind the sheets together at the said annular area.

9. A method in accordance with claim 8, wherein the heating of the annular area together with the silver solder is performed by a high-frequency current apparatus, turning the saw blade on an axle fixed in the apparatus.

10. A method in accordance with claim 7, further including, after finishing the steps of interconnecting the sheets, the following additional steps:

a. surface grinding the sheets to different thicknesses, and b. straightening the ground tool.

11. A method in accordance with claim 8 wherein the sheets have teeth around the periphery thereof and wherein the width of said annular area comprises at least the whole height of the teeth.

12. A method in accordance with claim 11 wherein said annular area is 1 – 10 mm. wider than the height of the teeth.

13. A method in accordance with claim 7 further including, prior to said mixing step, the steps of:

hot pressing the two sheet portions together at about 400°–440°C., surface grinding the sheets, straightening the sheets, and degreasing the sheets.

* * * * *